US011067969B2

(12) United States Patent
Kitamura et al.

(10) Patent No.: US 11,067,969 B2
(45) Date of Patent: Jul. 20, 2021

(54) RELAY DEVICE FOR RELAYING DATA BETWEEN DEVICES, CONTROL METHOD THEREFOR, AND NON-TRANSITORY COMPUTER-READABLE RECORDING MEDIUM THEREFOR

(71) Applicant: OMRON Corporation, Kyoto (JP)

(72) Inventors: Yasuhiro Kitamura, Ritto (JP); Toshiyuki Ozaki, Ritto (JP); Shintaro Ueno, Kusatsu (JP)

(73) Assignee: OMRON Corporation, Kyoto (JP)

( * ) Notice: Subject to any disclaimer, the term of this patent is extended or adjusted under 35 U.S.C. 154(b) by 201 days.

(21) Appl. No.: 15/751,478

(22) PCT Filed: Dec. 6, 2016

(86) PCT No.: PCT/JP2016/086255
§ 371 (c)(1),
(2) Date: Feb. 9, 2018

(87) PCT Pub. No.: WO2017/158954
PCT Pub. Date: Sep. 21, 2017

(65) Prior Publication Data
US 2018/0196410 A1 Jul. 12, 2018

(30) Foreign Application Priority Data
Mar. 14, 2016 (JP) .............................. JP2016-049318

(51) Int. Cl.
*G05B 19/00* (2006.01)
*G05B 19/418* (2006.01)
(Continued)

(52) U.S. Cl.
CPC ....... *G05B 19/4185* (2013.01); *G05B 19/042* (2013.01); *G05B 19/052* (2013.01);
(Continued)

(58) Field of Classification Search
CPC combination set(s) only.
See application file for complete search history.

(56) References Cited

U.S. PATENT DOCUMENTS 9,804,855 B1 * 10/2017 Paningipalli .............. G06F 8/64
10,547,666 B2 * 1/2020 Vasko ................ G05B 19/4185
(Continued)

FOREIGN PATENT DOCUMENTS

| CN | 101969456 | 2/2011 |
| CN | 103873344 | 6/2014 |

(Continued)

OTHER PUBLICATIONS

"IO-Link Interface and System", Version 1.1.2 , Jul. 13, 2013, pp. 1-262. Retrieved from: https://io-link.com/share/Downloads/Spec-Interface/IOL-Interface-Spec_10002_V112_Jul13.pdf.
(Continued)

*Primary Examiner* — Farhan M Syed
(74) *Attorney, Agent, or Firm* — JCIPRNET (57) ABSTRACT

The present invention addresses the problem whereby the number of commands to be transmitted increases in accordance with an increase in the number of devices to be backed up and restored, and processing becomes complex. An IO-Link master is provided with: an upper-level communication control unit which receives an instruction to execute backup in which setting information is acquired from IO-Link devices, and stored in a storage unit; and a backup control unit which executes backup of the plurality of IO-Link devices in accordance with the one received instruction.

6 Claims, 7 Drawing Sheets

(51) Int. Cl.
*G05B 19/042* (2006.01)
*G05B 19/05* (2006.01)
(52) U.S. Cl.
CPC .. *G05B 19/054* (2013.01); *G05B 2219/23067* (2013.01); *G05B 2219/23193* (2013.01); *G05B 2219/25242* (2013.01); *G05B 2219/31333* (2013.01)

(56) References Cited

U.S. PATENT DOCUMENTS

| | | | |
|---|---|---|---|
| 2003/0158635 A1* | 8/2003 | Pillar | B60R 16/0315 701/1 |
| 2011/0119458 A1* | 5/2011 | Matsuzaki | G06F 11/1451 711/162 |
| 2014/0067089 A1* | 3/2014 | Kanbe | G05B 19/41845 700/73 |
| 2014/0331333 A1* | 11/2014 | Frost | G06F 21/88 726/28 |
| 2015/0261969 A1* | 9/2015 | Frost | G06F 21/88 726/30 |
| 2015/0277411 A1* | 10/2015 | Nakajima | G05B 19/0423 700/11 |
| 2015/0331827 A1* | 11/2015 | Beyer | G06F 13/423 710/61 |
| 2016/0282828 A1* | 9/2016 | Jauquet | G05B 19/042 |
| 2016/0282843 A1* | 9/2016 | Michalscheck | F16K 37/0025 |
| 2016/0282854 A1* | 9/2016 | Jauquet | G05B 19/042 |
| 2016/0282858 A1* | 9/2016 | Michalscheck | G07C 9/28 |
| 2016/0285959 A1* | 9/2016 | Vasko | G05B 19/4185 |
| 2017/0293767 A1* | 10/2017 | Barton | G06F 21/41 |
| 2018/0321661 A1* | 11/2018 | Main-Reade | G05B 19/41875 |
| 2019/0219991 A1* | 7/2019 | Main-Reade | G05B 19/41875 |

FOREIGN PATENT DOCUMENTS

| | | |
|---|---|---|
| CN | 104380666 | 2/2015 |
| JP | S59-27311 | 2/1984 |
| JP | 2007102764 | 4/2007 |
| JP | 2011-180863 | 9/2011 |
| JP | 2012114093 | 6/2012 |
| JP | 2014-174616 | 9/2014 |

OTHER PUBLICATIONS

"Search Report of Europe Counterpart Application", dated Oct. 17, 2019, p. 1-p. 8.

"Office Action of Japan Counterpart Application," dated Oct. 30, 2018, with English translation thereof, p. 1-p. 6.

"International Search Report (Form PCT/ISA/210) of PCT/JP2016/086255", dated Mar. 7, 2017, with English translation thereof, pp. 1-2.

"Written Opinion (Form PCT/ISA/237)", dated Mar. 7, 2017, with English translation thereof, pp. 1-6.

Chen Xuhong et al., "Synchronous control for crankshaft grinder head-tail stock based on IO-Link of FANUC system" Hubei University of Automotive Technology, Dec. 31, 2015, p. 1-5.

Office Action of China Counterpart Application, with English translation thereof, dated Aug. 30, 2019, pp. 1-15.

\* cited by examiner

RELAY DEVICE FOR RELAYING DATA BETWEEN DEVICES, CONTROL METHOD THEREFOR, AND NON-TRANSITORY COMPUTER-READABLE RECORDING MEDIUM THEREFOR

CROSS-REFERENCE TO RELATED APPLICATION

This application is a 371 of international application of PCT application serial no. PCT/JP2016/086255, filed on Dec. 6, 2016, which claims the priority benefit of Japanese application serial no. 2016-049318, filed on Mar. 14, 2016. The entirety of each of the abovementioned patent applications is hereby incorporated by reference herein and made a part of this specification.

TECHNICAL FIELD

The present invention relates to a relay device relaying data between a control device and a device in a factory automation (FA) system and, more particularly, to a relay device having a backup function of setting information of devices and the like.

BACKGROUND ART

Generally, an FA system includes a master device (control device), a slave device (relay device), and devices such as a sensor and the like, and the master device controls the operations of the devices and receives output data of the devices through the slave device. Conventionally, improvements of such FA systems have progressed. For example, in the following Patent Literature 1, a technique for reducing the amount of data communication at the time of backing up parameter settings of a control device (equivalent to the slave device described above) in a programmable logic controller (PLC; equivalent to the master device described above) is disclosed.

Figure 7:
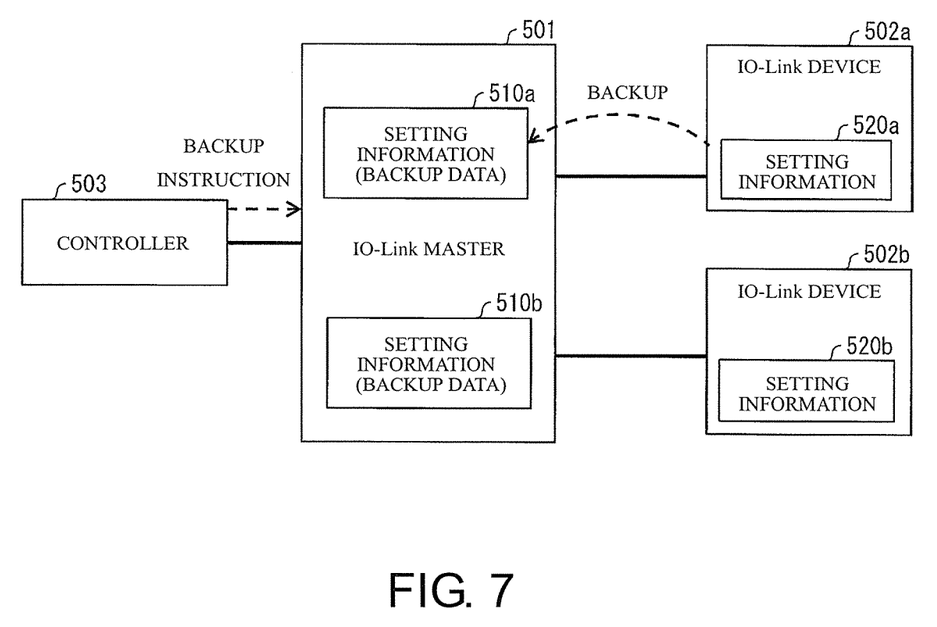
FIG. 7 is a diagram illustrating a conventional technique and is a diagram illustrating an overview of backup of setting information of IO-Link devices in an IO-Link system.

In addition, in an IO-Link (registered trademark) protocol used in an FA system, the setting information of an IO-Link device can be backed up in an IO-Link master. This will be described with reference to FIG. 7. FIG. 7 is a diagram illustrating a conventional technology and is a diagram illustrating an overview of backup of setting information of an IO-Link device in an IO-Link system.

In the IO-Link system illustrated in the drawing, an IO-Link master 501 (equivalent to the slave device described above), IO-Link devices 502a and 502b, and a controller 503 (equivalent to the master device described above) are included.

In this IO-Link system, in a case in which setting information 520s of the IO-Link device 502a is backed up, as illustrated in the drawing, a backup instruction for the IO-Link device 502a is transmitted from the controller 503 to the IO-Link master 501. Accordingly, the IO-Link master 501 acquires the setting information 520a from the IO-Link device 502a and stores the setting information as setting information 510a (backup data). This similarly applies to the IO-Link device 502b. In other words, a backup instruction for the IO-Link device 502b is transmitted from the controller 503 to the IO-Link master 501, and the IO-Link master 501 acquires the setting information 520b from the IO-Link device 502a and stores the acquired setting information as setting information 510b (backup data).

CITATION LIST

Patent Literature

[Patent Literature 1]
Japanese Unexamined Patent Application Publication No. 2014-174616 (published on Sep. 22, 2014)

SUMMARY OF INVENTION

Technical Problem

In the conventional technique described above, in order to back up an IO-Link device, it is essential to issue a backup instruction to the IO-Link device, and there is a problem in that a process in a case in which there are many IO-Link devices desired to be backed up becomes complicated. For example, in a case in which eight IO-Link devices are connected to one IO-Link master, and all of them need to be backed up, it is necessary for the controller 503 to issue eight backup instructions.

In addition, in an IO-Link system, while a restoring process in which backup data is transmitted to an IO-Link device and is stored therein can be performed, there are the same problems described above for the restoring process. In other words, in a case in which a restoring process is performed for a plurality of IO-Link devices, restoring instructions need to be issued in correspondence with the number of IO-Link devices, and as the number of target IO-Link devices increased, the process becomes complicated accordingly.

In addition, such a problem is not limited to an IO-Link system but is a common problem to an FA system capable of backing up setting information of devices in a relay device such as a slave device.

The present invention is made in view of the problems described above, and an object thereof is to realize a relay device and the like capable of backing up or restoring setting information of a plurality of devices in a simplified manner.

Solution to Problem

In order to solve the problems described above, according to one aspect of the present invention, there is provided a provided a relay device that relays data between a control device and a plurality of devices that are control targets of the control device and operates in accordance with setting information and includes: a receiving unit that receives an instruction for executing backup of acquiring the setting information from the devices and storing the acquired setting information in a storage unit or an instruction for executing restoring of transmitting the setting information stored in the storage unit to the devices and storing the setting information in the devices; and a setting information processing unit that executes backup of the plurality of devices or executes restoring of the plurality of devices in accordance with one instruction received by the receiving unit.

According to one aspect of the present invention, in order to solve the problems described above, there is provided a control method for a relay device that relays data between a control device and a plurality of devices that are control targets of the control device and operates in accordance with setting information, the control method including: a receiving step of receiving an instruction for executing backup of acquiring the setting information from the devices and storing the acquired setting information in a storage unit or an instruction for executing restoring of transmitting the setting information stored in the storage unit to the devices and storing the setting information in the devices; and a setting information processing step of executing backup of the plurality of the devices or executing restoring of the plurality of the devices in accordance with one instruction received in the receiving step.

Advantageous Effects of Invention

According to one aspect of the present invention, an effect that setting information of a plurality of devices can be backed up or restored in a simplified manner is acquired.

DESCRIPTION OF EMBODIMENTS

Embodiment 1

Embodiment 1 of the present invention will be described with reference to FIGS. 1 to 4.
[System Overview]

Figure 2:
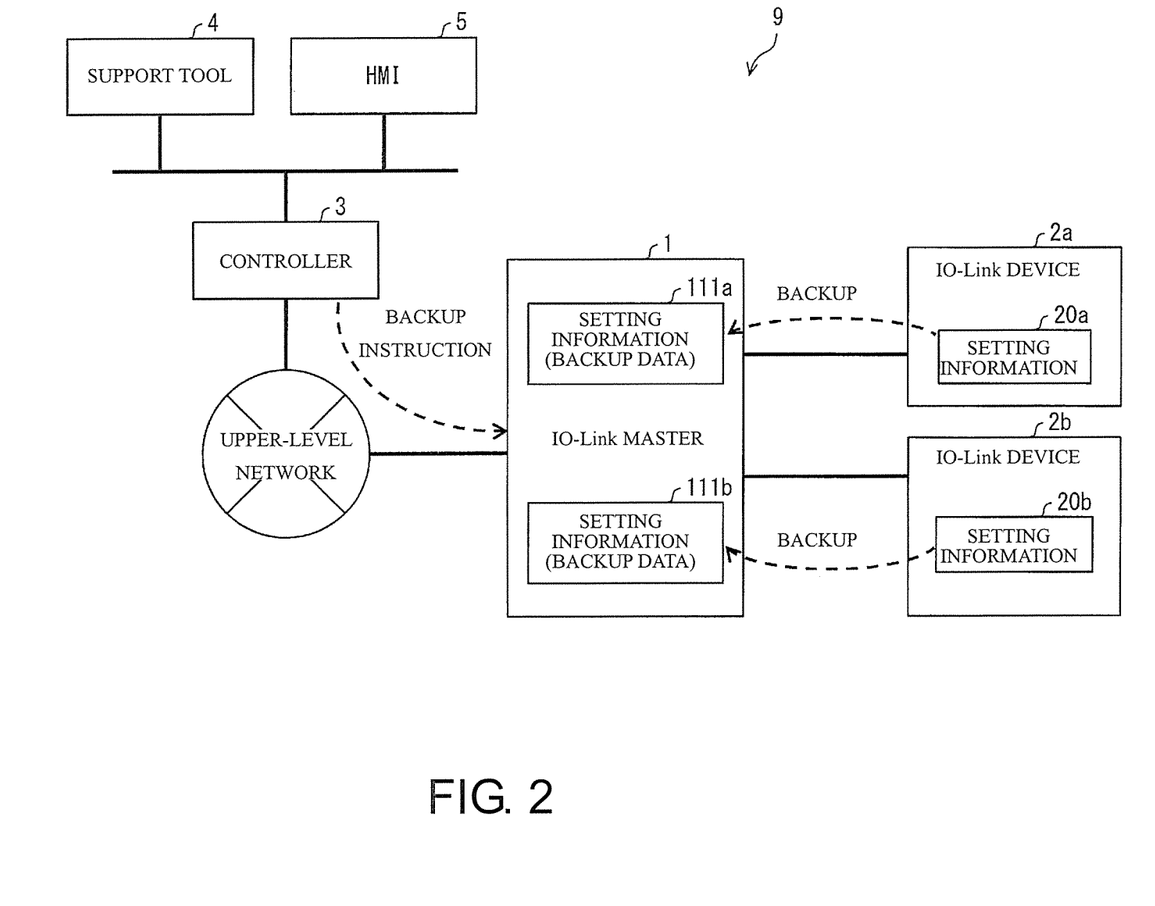
FIG. 2 is diagram illustrating an overview of an IO-Link system including the IO-Link master.

First, an overview of an IO-Link system according to this embodiment will be described with reference to FIG. 2. FIG. 2 is a diagram illustrating an overview of an IO-Link system 9. The IO-Link system 9 is an FA system, and an IO-Link master (relay device) 1, an IO-Link device 2a, an IO-Link device 2b, a controller 3 (control device), a support tool 4, and an HMI 5 (display input device) are included in the IO-Link system 9 as illustrated in the drawing. When the IO-Link devices 2a and 2b do not need to be discriminated from each other, each thereof will be denoted as an IO-Link device 2.

The IO-Link master 1 is a relay device that relays data between a upper-level network including a controller 3 and the IO-Link device 2 (device) and operates as a slave device of the controller in the IO-Link system 9. In the example illustrated in the drawing, although two IO-Link devices 2 are connected to the IO-Link master 1, three or more IO-Link device 2 may be connected thereto. In addition, the IO-Link master 1 can bidirectionally communicate with the IO-Link device 2.

The IO-Link device 2 is a device that is communicably connected to the IO-Link master 1 and is a control target of the controller 3. As the IO-Link device 2, a device of an output system and a device of an input system may be applied. Examples of a device of the input system include various sensors such as a photoelectric conversion sensor and a proximity sensor, and examples of a device of the output system includes an actuator, a monitor, and the like. In addition, a conversion device such as an inverter and the like may be set as IO-Link devices 2.

The controller 3 is a control device that integrally controls the overall operation of the IO-Link system 9 and is also called a programmable logic controller (PLC). The controller 3 operates as a master device of the IO-Link master 1 in the IO-Link system 9.

The support tool 4 is a device that is used with being connected to the IO-Link system 9 for various settings in the IO-Link system 9 such as an operation setting of the IO-Link device 2 and the like. The support tool 4 can be connected to the IO-Link system 9 through the controller 3. As the support tool 4, an information processing device such as a PC can be used, and an information processing device of a portable type such as a notebook computer can be used.

The HMI 5 is a display input device of a touch panel type, and a user using the IO-Link system 9 can operate the controller through the HMI 5 or can check the operation state of the IO-Link system 9 in the HMI 5.

In the IO-Link system 9 having the configuration described above, in accordance with reception of a backup instruction from the controller 3, as illustrated in the drawing, the IO-Link master 1 backs up the setting information 20 of a plurality of IO-Link devices 2 together. In more detail, the IO-Link master 1 acquires setting information 20a stored by the IO-Link device 2a from the IO-Link device 2a and stores the setting information as backup data (setting information 111a). In addition, the IO-Link master 1 acquires setting information 20b stored by the IO-Link device 2b from the IO-Link device 2b and stores the setting information as backup data (setting information 111b).

When the setting information 111a and the setting information 111b do not need to be discriminated from each other, each thereof will be denoted by setting information 111. Similarly, when the setting information 20a and the setting information 20b do not need to be discriminated from each other, each thereof will be denoted by setting information 20. Here, the setting information 20 is information representing an operation setting of the IO-Link device 2, and the IO-Link device 2 operates in accordance with the setting information 20. For example, as examples of the setting information 20 of a case in which the IO-Link device 2 is a photoelectric conversion sensor, there are a key lock setting defining whether or not a setting is locked using a hardware switch included in a photoelectric conversion sensor, a light on/dark on setting defining whether an on signal is output when light is detected and whether an on signal is output when light is not detected, a delay timer setting defining a standby time until an on signal or an off signal is output after the output condition of the on signal or the off signal is satisfied, and the like.

In this way, in the IO-Link system 9, the setting information 20 of a plurality of IO-Link devices 2 is backed up in accordance with one backup instruction, and accordingly, the setting information 20 of the plurality of IO-Link devices 2 can be backed up in a simplified manner.
[IO-Link]

The IO-Link will be additionally described below. The IO-Link is standardized under the name of "Single-drop digital communication interface for small sensors and actuators" (SDCI) and is a standardized technology for communication between a master that is a control device (the controller 3 described above is equivalent to this) and a device such as a sensor, an actuator, or the like. The IO-Link is a new point-to-point serial communication protocol used for communication between the mater and a device. Examples of the device includes a photoelectric conversion sensor and a proximity sensor.

The IO-Link is different from a conventional protocol enabling only transmission of an on/off signal (one bit) from a device to a master and is a communication protocol capable of transmitting and receiving (bidirectional communication) of 32-bytes (256-bits) data. By linking a master and a device using an IO-Link, as a signal from the device, while conventionally only binary data such as on/off information can be received, numerical data of 32 bits can be acquired. Accordingly, for example, in the case of a photoelectric sensor, information such as the amount of received light, a detection margin, and an internal temperature can be acquired, and thus, in addition to the support for the acquisition of a cause of a defect, a diagnosis of a product life, change of a threshold value according to aging degradation, and the like can be performed.

By using the IO-Link, for example, the setting, the maintenance, and the like of devices can be automated. In addition, by using the IO-Link, the programming of the master can be drastically simplified, and reduction in the cost of the wiring cable and the like can be realized.

Subsequently, an IO-Link system using the IO-Link described above (the IO-Link system 9 described above is equivalent to this) will be described. The IO-Link system is configured by an IO-Link device (generally, a sensor, an actuator, or a combination thereof, and the IO-Link device 2 described above is equivalent to this), a standard three-wire type sensor/actuator cable, and an IO-Link master (the IO-Link master 1 is equivalent to this).

The IO-Link master includes one or a plurality of ports (device communication ports 12 to be described later are equivalent to these), and one IO-Link device can be connected to each port. The IO-Link master executes point-to-point communication with the IO-Link device. The IO-Link master can transmit/receive not only binary data (data of one bit) such as conventional on/off data but also information (data larger than one bit) such as identification information of a device, a communication property of a device, a device parameter, and information of process diagnosis data to/from an IO-Link device.

The IO-Link device can transmit/receive data larger than one bit to/from the IO-Link master. In other words, the IO-Link device is a device that is appropriate for the IO-Link. In addition, in the IO-Link system, a device such as a sensor or an actuator other than an IO-Link device (not transmitting/receiving data larger than one bit) can be embedded.

[Main Configuration of IO-Link Master 1]

Figure 1:
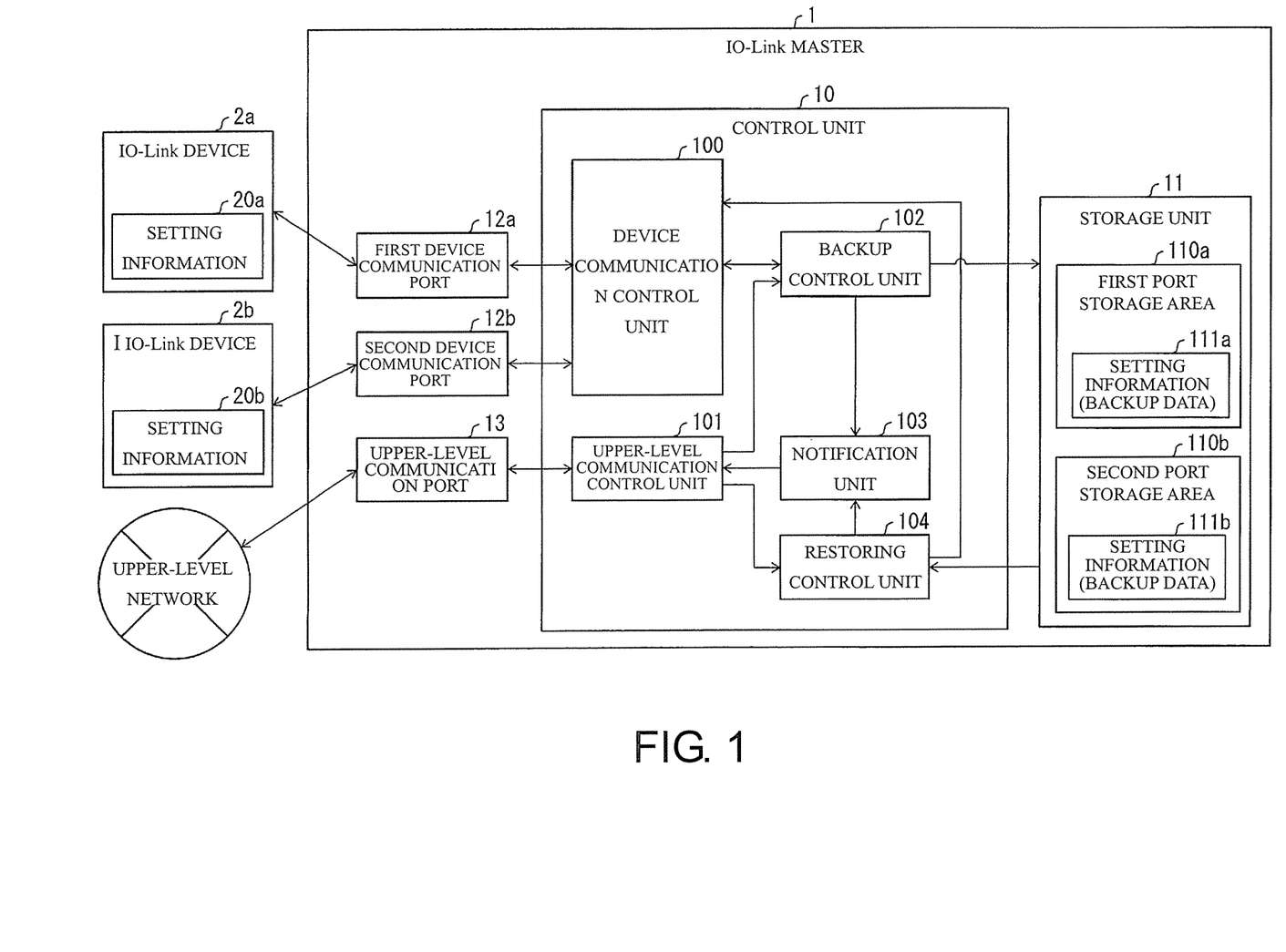
FIG. 1 is a block diagram illustrating one example of the main configuration of an IO-Link master according to Embodiment 1 of the present invention.

Next, the main configuration of the IO-Link master 1 will be described with reference to FIG. 1. FIG. 1 is a block diagram illustrating one example of the main configuration of the IO-Link master 1. As illustrated in the drawing, the IO-Link master 1 includes a control unit 10 that integrally controls each unit of the IO-Link master 1 and a storage unit 11 that stores various kinds of data used by the IO-Link master 1. In addition, the IO-Link master 1 includes a first device communication port 12a and a second device communication port 12b as communication ports used for communicating with the IO-Link device 2. Furthermore, the IO-Link master 1 includes an upper-level communication port 13 used for communicating with an upper-level network including the controller 3 described above. When the first device communication port 12a and the second device communication port 12b do not need to be distinguished from each other, each will be denoted as a device communication port 12. The number of device communication port 12 may be three or more.

The control unit 10 includes a device communication control unit 100, an upper-level communication control unit (receiving unit) 101, a backup control unit (setting information processing unit) 102, a notification unit 103, and a restoring control unit (setting information processing unit) 104. In the storage unit 11, a first port storage area 110a and a second port storage area 110b are included, and setting information 111a and setting information 111b are respectively stored in the storage areas. When the first port storage area 110a and the second port storage area 110b do not need to be distinguished from each other, each will be denoted as a port storage area 110.

The device communication control unit 100 controls communication with the IO-Link device 2. In addition, the upper-level communication control unit 101 controls communication with devices such as the controller 3 included in the upper-level network and the like. For example, the device communication control unit 100 receives a backup instruction or a restoring instruction from the upper-level network. The communication with the upper-level network, for example, may be performed using Ethernet Control Automation Technology (EtherCAT; registered trademark) or the like.

The backup control unit 102 controls backup of the setting information 20 stored by the IO-Link device 2. More specifically, the backup control unit 102 acquires the setting information 20 from the IO-Link device 2 and stores the acquired setting information in the port storage area 110 corresponding to the IO-Link device 2 as backup data (setting information 20). In addition, the backup control unit 102 also performs an updating process of overwriting the backup data with the setting information 20 acquired from the IO-Link device 2 of which backup data has already been stored.

When the backup process using the backup control unit 102 is completed, the notification unit 103 notifies the device of the upper-level network of the completion. In addition, in a case in which there is an IO-Link device 2 of which backup or restoring is not completed normally, the notification unit 103 notifies of the device of the upper-level network of such an indication. Accordingly, a user can recognize the presence of the IO-Link device 2 of which backup or restoring is not completed normally. In addition, as devices of the upper-level network, for example, there are the controller 3, a support tool 4, an HMI 5, and the like.

The restoring control unit 104 transmits the setting information 111 stored in the storage unit 11 as backup data to the IO-Link device 2 and performs a restoring process of updating the setting information 20 stored by the IO-Link device 2.

The port storage area 110 is a storage area disposed for each device communication port 12, and data relating to each device communication port 12 is stored in the port storage area 110. More specifically, in the first port storage area 110a, backup data (setting information 111a) of the IO-Link device 2a connected to the first device communication port 12a is stored as data relating to the first device communication port 12a. Similarly, in the second port storage area 110b, backup data (setting information 111b) of the IO-Link device 2b connected to the second device communication port 12b is stored as data relating to the second device communication port 12b.

[Starting and Backup of System]

The timing of backup is not particularly limited, and, for example, backup may be performed at the starting time of the IO-Link system 9. When the IO-Link system 9 is started, first, after each device configuring the IO-Link system 9 is connected using a predetermined communication cable for a communication connection, the initial setting of each device is performed. The initial setting can be performed through the support tool 4, and when the initial setting ends, the setting information 20 is stored in the IO-Link device 2.

Once the initial setting is performed, the IO-Link system 9 is in an operable state, and thus, after the end of the initial setting, a trial run is performed, and it is checked whether or not the whole IO-Link system 9 is in a desired operation state. In a case in which there is found to be a problem as a result of this checking, adjustment such as correction of the setting information 20 is performed, and the setting information 20 is backed up to a time point at which the system operated without any problem. The correction of the setting information 20 may be performed through the support tool 4 or through an input unit for the IO-Link device 2 including the input unit.

The backup is performed by the IO-Link master 1 by transmitting a backup instruction from the controller 3, the support tool 4, or the HMI 5 to the IO-Link master 1. Then, in accordance with the end of the backup, the starting process ends, and the IO-Link system 9 is in an operable state.

[Trigger of Backup]

Figure 3:
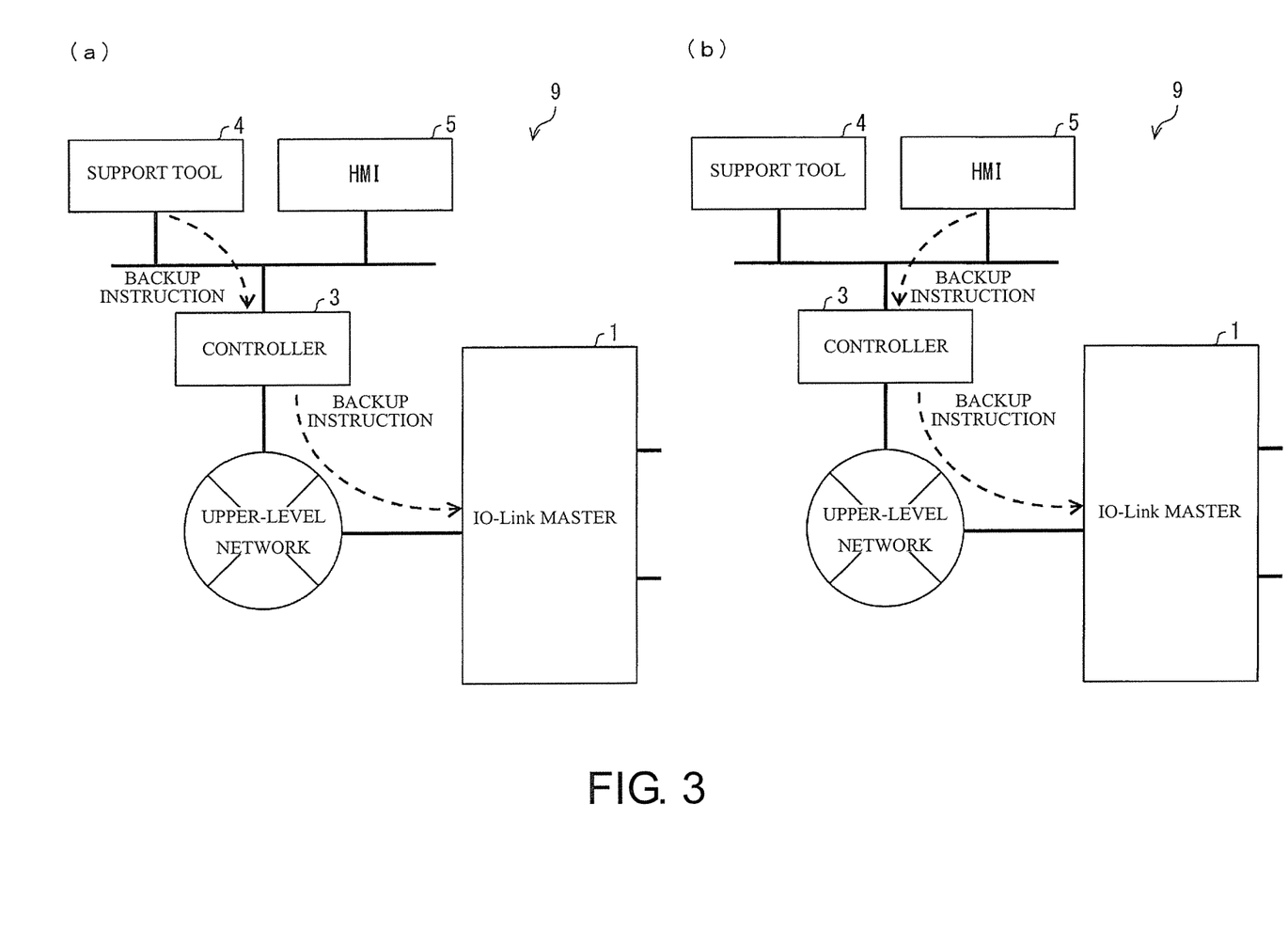
FIG. 3 is a diagram illustrating an example in which a backup instruction is transmitted from an upper-level network to the IO-Link master.

The backup using the IO-Link master 1 can be performed in accordance with an instruction from the upper-level network. This will be described with reference to FIG. 3. FIG. 3 is a diagram illustrating an example in which a backup instruction is transmitted from the upper-level network to the IO-Link master 1.

As illustrated in (a) of the drawing, a backup instruction can be transmitted from the support tool 4 to the IO-Link master 1 through the controller 3. In addition, as illustrated in (b) of the drawing, a backup instruction can be transmitted from the HMI 5 to the IO-Link master 1 through the controller 3. The control performed irregularly in the IO-Link like this backup instruction is performed by transmitting a command of a predetermined format called a message. The generation of the message may be performed by the controller 3 or the HMI 5 or the support tool 4. For example, in the example of (a) in the drawing, the support tool 4 may generate a message of a backup instruction and be transmitted to the IO-Link master 1 with being relayed by the controller 3. In addition, the controller 3 may generate a message of a backup instruction in accordance with a backup instruction from the support tool 4 to the controller 3 and transmit the generated message to the IO-Link master 1. This similarly applies also to the example of (b) illustrated in the drawing.

In addition, the source of the backup instruction is not limited to that of each example described above. For example, in a case in which the IO-Link master 1 has a radio communication function, a backup instruction may be directly transmitted to the IO-Link master 1 using the radio communication function. In addition, a hardware key (a button or the like) used for executing backup may be disposed in the IO-Link master 1, and the backup of a plurality of IO-Link devices 2 may be executed by being triggered upon an operation of the hardware key. Furthermore, the same hardware keys may be disposed in the IO-Link devices 2. In such a case, the IO-Link device 2 notifies of the IO-Link master 1 of an operation of the hardware key. Then, backup of a plurality of IO-Link devices 2 including the IO-Link device 2 that is the operation target may be performed by the IO-Link master 1 by being triggered upon this notification (backup instruction). According to such a configuration, backup can be executed without using the support tool 4 or the like, and the process from the starting of the IO-Link system 9 to the backup can be smoothly and easily performed by a staff present at the installation place of the IO-Link system 9.

[Flow of Process]

Figure 4:
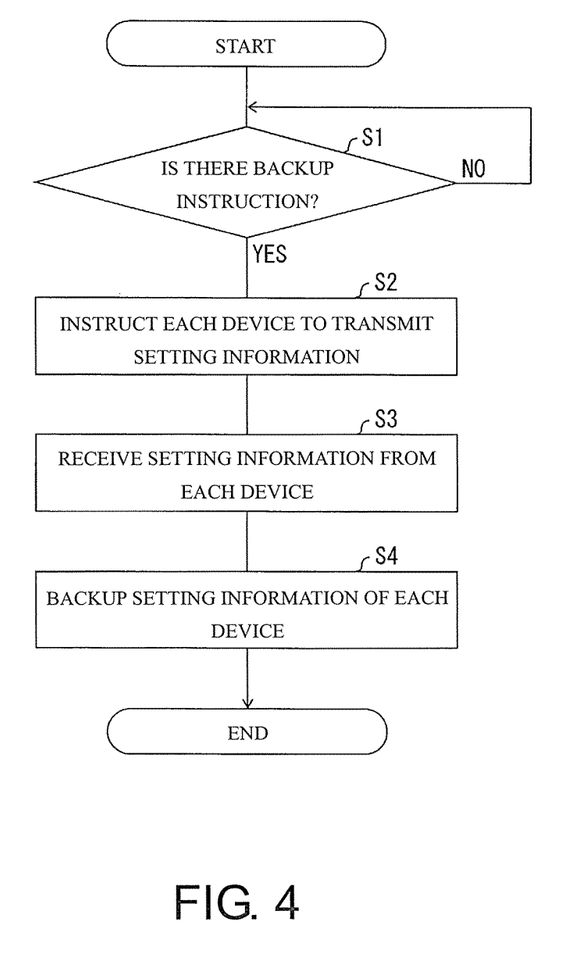
FIG. 4 is a flowchart illustrating one example of a backup process using the IO-Link master.

Next, the flow of the process performed by the IO-Link master 1 will be described with reference to FIG. 4. FIG. 4 is a flowchart illustrating one example of a backup process using the IO-Link master 1 (a control method for the relay device).

The backup control unit 102 waits for a backup instruction (S1; receiving step). Here, in a case in which a backup instruction is detected (Yes in S1), the backup control unit 102 instructs the IO-Link device 2 connected to each device communication port 12 to transmit the setting information 20 (S2).

Next, as a response to the instruction described above, each IO-Link device 2 transmits the setting information 20 to the IO-Link master 1, and accordingly, the backup control unit 102 receives such setting information 20 (S3).

Then, the backup control unit 102 stores the received setting information 20 in the port storage area 110 of the device communication port 12 corresponding to the IO-Link device 2 that is the transmission source of the setting information 20 as the setting information 111 (S4, setting information processing step). In addition, when the backup of the all the IO-Link device 2 ends, the notification unit 103 notifies a device of an upper-level network such as the controller 3 or the transmission source (the support tool 4 or the HMI 5) of the backup instruction that has received in S1 of an indication thereof, and the process ends.

In addition, the backup of the plurality of IO-Link devices 2 may be performed together at the same time or be sequentially performed. There are cases in which backup fails due to a communication error or no connection of the IO-Link device 2 to the device communication port 12, or the like. In such cases, the notification unit 103 may notify the device of the upper-level network of information (the identification information of the device, the identification information of the device communication port 12, or the like) representing the IO-Link device 2 of which backup has failed. In addition, in a case in which the reason of the failure of the backup is determined, the reason may be notified together. In this way, the presence of the IO-Link device 2 of which backup has failed and the reason thereof are displayed, for example, on the HMI 5, whereby a user can recognize them.

Embodiment 2

Figure 5:
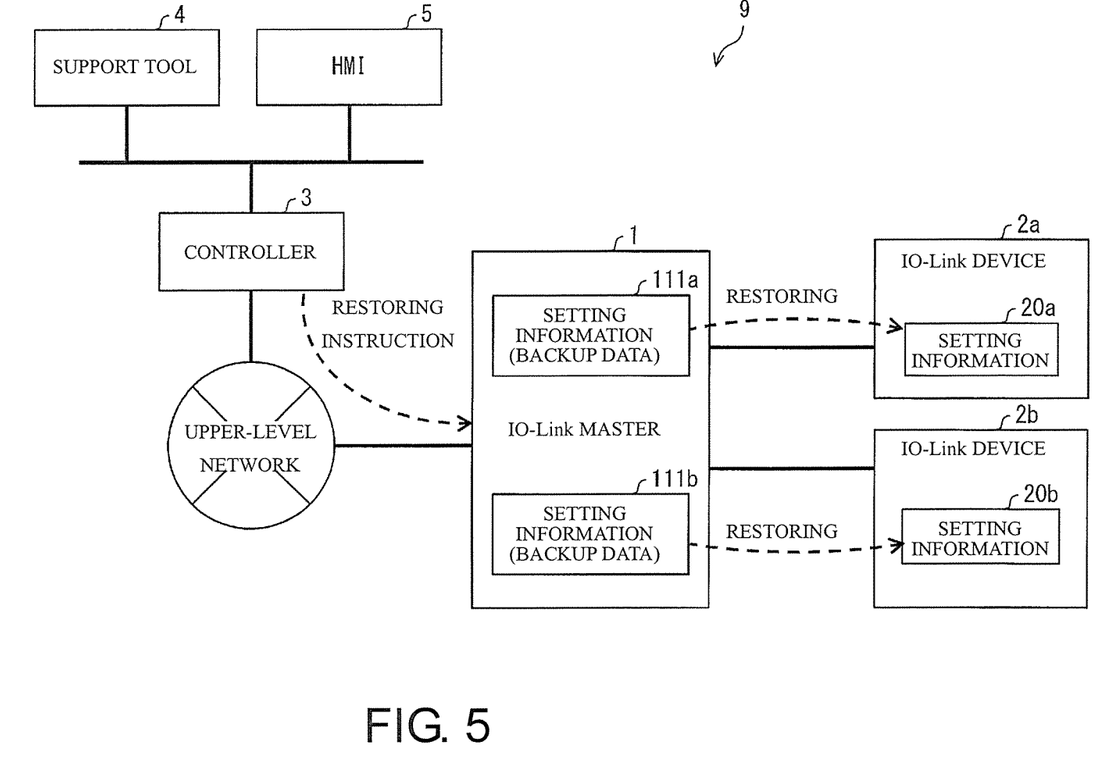
FIG. 5 is a diagram illustrating Embodiment 2 and is a diagram illustrating an example of an IO-Link master restoring a plurality of IO-Link devices in accordance with one restoring instruction.

Embodiment 2 of the present invention will be described with reference to FIG. 5. FIG. 5 is a diagram illustrating an example of an IO-Link master 1 that executes restoring of a plurality of IO-Link devices 2 in accordance with one restoring instruction. The same reference numeral will be assigned to a configuration that is similar to that of the embodiment described above, and description thereof will not be presented here. This similarly applies also to Embodiment 3 and subsequent embodiments.

The IO-Link master 1 according to this embodiment, as illustrated in the drawing, in accordance with reception of one restoring instruction from the controller 3, transmits the setting information 111 to each of the plurality of IO-Link devices 2 and restoring the setting information 20 of each IO-Link device 2. In more detail, a restoring control unit 104 of the IO-Link master 1 transmits the setting information 111a to the IO-Link device 2a and thus stores the setting information as the setting information 20a. Similarly, the restoring control unit 104 transmits the setting information 111b to the IO-Link device 2b and thus stores the setting information as the setting information 20b. In addition, in a case in which the setting information 20 has already been stored, the setting information is overwritten using the transmitted setting information 111.

In this way, in the IO-Link system 9 according to this embodiment, a plurality of IO-Link devices 2 are restored in accordance with one restoring instruction, and accordingly, the restoring of the plurality of IO-Link devices 2 can be performed in a simple manner. Accordingly, the setting of the plurality of IO-Link devices 2 at the time of generating a copy line having a system configuration similar to that of the operating IO-Link system 9 can be very easily performed.

In addition, there are various variations in the source of the restoring instruction similar to those in the backup instruction according to Embodiment 1. For example, similar to the example illustrated in FIG. 3, a restoring instruction may be input to the IO-Link master 1 from the support tool 4 or the HMI 5 through the controller 3, and a restoring instruction may be directly transmitted to the IO-Link master 1 not through any other device.

In addition, the IO-Link master 1 may have any one of a function of executing restoring of a plurality of IO-Link devices 2 in accordance with one restoring instruction and a function of executing backup of a plurality of IO-Link devices 2 in accordance with one backup instruction.

Embodiment 3

Figure 6:
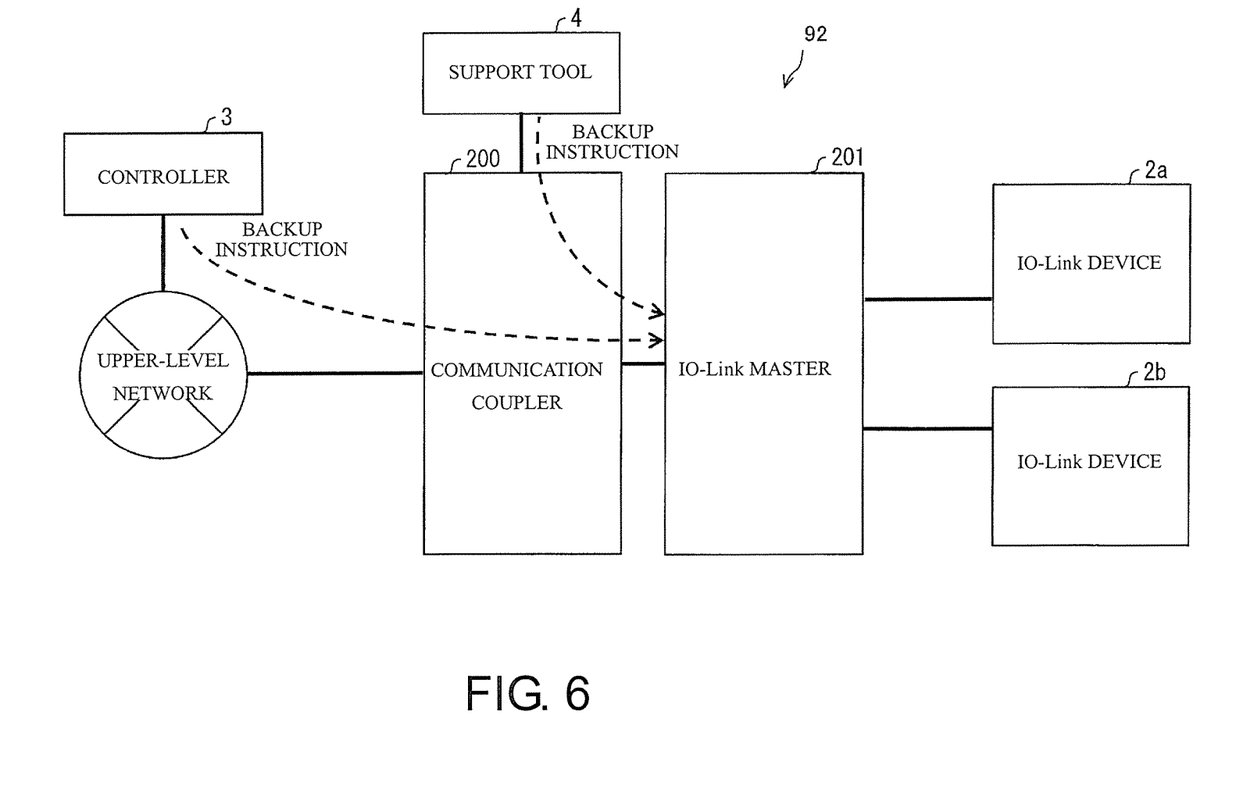
FIG. 6 is a diagram illustrating Embodiment 3 of the present invention and is a diagram illustrating an example of an IO-Link system in which a communication function for communicating with an upper-level network in an IO-Link master is separated as a communication coupler.

Embodiment 3 of the present invention will be described with reference to FIG. 6. FIG. 6 is a diagram illustrating an example of an IO-Link system 92 in which a communication function for communicating with an upper-level network in an IO-Link master is separated as a communication coupler.

While the IO-Link system 92 illustrated in the drawing is a system having functions similar to those of the IO-Link system 9 described above, instead of the IO-Link master 1 of the IO-Link system 9, a communication coupler 200 and an IO-Link master 201 are included, which is different from the IO-Link system 9.

The communication coupler 200 is a relay device relaying communication between an upper-level network and the IO-Link master 201. The communication coupler 200 includes a communication port equivalent to one upper-level communication port 13 (see FIG. 1) of the IO-Link master 1 and a communication port used for communicating with the IO-Link master 201. In addition, the communication coupler 200 includes a communication control unit equivalent to the upper-level communication control unit 101 (see FIG. 1) of the IO-Link master 1 and relays communication between a device included in the upper-level network and the IO-Link master 201 by using the communication control unit.

The IO-Link master 201 has a configuration similar to that of the IO-Link master 1 except for inclusion of a communication port used for communicating with the communication coupler 200 instead of the upper-level communication port 13 (see FIG. 1).

Also in the IO-Link system 92, similar to the IO-Link system 9 described above, although a backup instruction is transmitted from the controller 3, this backup instruction is received by the IO-Link master 201 through the communication coupler 200. A backup process after the reception of a backup instruction is similar to that of the IO-Link master 1, and thus description thereof will not be repeated here.

In addition, in a case in which the communication coupler 200 includes an interface used for a connection with the support tool 4, as illustrated in FIG. 6, the backup instruction may be transmitted from the support tool 4 to the communication coupler 200 through the interface. In such a case, the backup instruction is transmitted from the communication coupler 200 to the IO-Link master 201. In addition, in a case in which the IO-Link master 201 includes an interface used for a connection with the support tool 4, a backup instruction may be directly transmitted from the support tool 4 to each IO-Link master 201 through the interface.

In addition, the IO-Link master 201 of the IO-Link system 92, similar to the IO-Link master 2 according to Embodiment 2, in accordance with reception of one restoring instruction, can execute restoring of a plurality of IO-Link devices 2.

Modified Example

In Embodiments 1 to 3, while the FA system using the IO-Link has been described as an example, the present invention can be applied to any FA system in which a slave device executes backup of a device, and bidirectional communication between the device and the slave device can be performed. For example, the present invention can be applied to an FA system using CC-Link or the like.

In addition, in the embodiment described above, while an example in which backup and restoring of a plurality of devices (IO-Link devices 2) connected in parallel with the slave device (the IO-Link master 1) are executed altogether has been illustrated, a similar process may be performed for a plurality of devices connected in series.

For example, in a case in which a plurality of devices can be connected to one device communication port (another device is further connected to a device connected to a device communication port) in series, the slave device may execute backup and restoring of the plurality of devices altogether.

In the IO-Link system 9 described above, cyclic communication is performed at a predetermined cycle. More specifically, the controller 3 transmits cyclic data to the IO-Link master 1, and the cyclic data is transmitted from the IO-Link master 1 to each IO-Link device 2. Then, the cyclic data is returned to the controller 3 from each IO-Link device 2 through the IO-Link master 1. Accordingly, the cyclic data is shared among devices configuring the IO-Link system 9. This similarly applies also to the IO-Link system 92.

The IO-Link masters 1 and 201 may perform instructions of backup and restoring in the cyclic communication as described above. By including the backup instruction and the restoring instruction in the cyclic data, the IO-Link master 1 can conveniently execute backup or restoring. More specifically, a flag corresponding to a backup instruction or a flag corresponding to a restoring instruction may be included in the cyclic data. Accordingly, by performing the on/off switching of the flag using the controller 3, backup or restoring can be executed at a timing at which the flag becomes on.

In addition, in the backup instruction or the restoring instruction, designation information used for designating a control target such as identification information of a target device communication port 12 or the identification information of the IO-Link device 2 may be included. In such a case, the backup control unit 102 executes backup of a device designated in the designation information, and the restoring control unit 104 executes restoring of the device designated in the designation information. Accordingly, it is capable of setting only a part of IO-Link devices 2 as targets for backup or restoring. In such a case, it is preferable that a plurality of targets for backup or restoring can be designated, and accordingly, the backup or the restoring of a plurality of IO-Link device s2 can be easily executed in a speedy manner.

In addition, the backup control unit 102 may determine the necessity of backup for each IO-Link device 2 that is a backup target and set only IO-Link devices 2 of which backup is determined to be necessary as backup targets. For example, setting of validness/invalidness of backup for each device communication port 12 may be stored therein in advance, and only IO-Link devices 2 connected to the device communication port 12 of which the setting is valid may be set as targets for backup.

In addition, for example, a determination unit may be arranged in the IO-Link master 1, where the determination unit is configured to determine whether or not the setting information 20 stored in the IO-Link device 2 and the setting information 111 stored as backup data coincide with each other through collation. Then, after the determination is performed by the determination unit, when a backup instruction is received within a predetermined time, IO-Link devices 2 for which collation results indicate no-coincidence may be set as targets for backup, and IO-Link devices 2 for which collation results indicate coincidence may be excluded from the targets for backup. In addition, each example described above may similarly applies to the restoring.

Example of Realization Using Software

The control blocks (particularly, the units included in the control unit 10) of the IO-Link master 1 may be realized by a logic circuit (hardware) formed on an integrated circuit (IC chip) or the like or may be realized by software using a central processing unit (CPU).

In the latter case, the IO-Link master 1 includes: a CPU executing a command of a program that is software realizing each function; a read only memory (ROM) or a storage device (these will be referred to as a recording medium) in which the program and various kinds of data are recorded in a computer (or CPU)-readable manner; a random access memory (RAM) expanding the program; and the like. Then, as the computer (or the CPU) reads the program described above from the recording medium and executes the read program, whereby the object of the present invention is achieved. As the recoding medium, a non-transitory type medium such as a tape, a disk, a card, a semiconductor memory, a programmable logic circuit, or the like may be used. In addition, the program described above may be supplied to the computer through an arbitrary transmission medium (a communication network or a broadcast wave, or the like) that can transmit the program. Furthermore, one aspect of the present invention may be realized in the form of a carrier wave-embedded data signal in which the program described above is implemented through electronic transmission. Then, by using a similar technique, control blocks of devices such as the IO-Link master 201, the communication coupler 200, and the like may be realized.

The present invention is not limited to each embodiment described above, various changes can be made in a range represented in the claims, and an embodiment acquired by appropriately combining technical means disclosed in different embodiments also belongs to the technical scope of the present invention.

SUMMARY

According to one aspect of the present invention, there is a provided a relay device that relays data between a control device and a plurality of devices that are control targets of the control device and operates in accordance with setting information and includes: a receiving unit that receives an instruction for executing backup of acquiring the setting information from the devices and storing the acquired setting information in a storage unit or an instruction for executing restoring of transmitting the setting information stored in the storage unit to the devices and storing the setting information in the devices; and a setting information processing unit that executes backup of the plurality of devices or executes restoring of the plurality of devices in accordance with one instruction received by the receiving unit.

According to the configuration described above, in accordance with one instruction that has been received, backup of a plurality of devices is executed, or restoring of a plurality of devices is executed. Accordingly, an effect of being capable of executing backup or restoring of the setting information of the plurality of devices in a simple manner by only issuing one instruction is acquired.

In addition, the setting information processing unit may execute backup of a device designated in designation information or execute restoring of the device designated in the designation information in a case in which the designation information designating the device is included in the one instruction received by the receiving unit.

According to the configuration described above, among a plurality of devices, the setting information of a designated device may be backed up, or the setting information of the designated device may be restored.

In addition, the relay device may further include a notification unit that notifies a user of a device of which backup or restoring is not been ended normally among the plurality of devices that are backup or restoring targets for the setting information processing unit.

According to the configuration described above, devices of which backup or restoring is not been ended normally ended among the plurality of devices can be recognized by a user.

In addition, the devices may be IO-Link devices. Many IO-Link devices are frequently used with being connected to one relay device, and thus the advantage of the configuration described above enabling easy execution of backup or restoring of the setting information of many IO-Link devices is particularly important.

According to one aspect of the present invention, there is provided a control method for a relay device that relays data between a control device and a plurality of devices that are control targets of the control device and operates in accordance with setting information, the control method including: a receiving step of receiving an instruction for executing backup of acquiring the setting information from the devices and storing the acquired setting information in a storage unit or an instruction for executing restoring of transmitting the setting information stored in the storage unit to the devices and storing the setting information in the devices; and a setting information processing step of executing backup of the plurality of the devices or executing restoring of the plurality of the devices in accordance with one instruction received in the receiving step. According to the configuration described above, the same operations and effects as those of the relay device can be acquired.

In addition, a control program causing a computer to function as the relay device by causing the computer to execute each of the steps described above and a computer-readable recording medium having recorded the control program thereon also belong to the categories of the present invention.

The invention claimed is:

1. A relay device that relays data between a control device and a plurality of IO-Link devices that are control targets of the control device and operates in accordance with setting information, the relay device comprising:
   an upper-level communication port communicating with an upper-level network;
   a plurality of device communication ports respectively communicating the plurality of IO-Link devices, wherein each of the IO-Link devices has a dedicated physical communication connection with respective device communication port of the relay device and enables bidirectional communication of 32-bytes data with the relay device;
   a storage device having a plurality of port storage areas respectively disposed for the plurality of device communication ports;
   a communication controller that receives a single instruction for executing backup of the IO-Link devices or a single instruction for executing restoring of the IO-Link devices from the upper-level network; and
   a processor that executes backup of the plurality of IO-Link devices by acquiring the setting information of the IO-Link devices through the respective device communication ports and storing the acquired setting information in the respective port storage areas of the storage device in accordance with the single instruction for executing backup of the IO-Link devices received by the communication controller and executes restoring of the plurality of IO-Link devices by transmitting the setting info illation stored in the respective port storage areas of the storage device to the IO-Link devices through the respective device communication ports in accordance with the single instruction for executing restoring of the IO-Link devices received by the communication controller.

2. The relay device according to claim 1, wherein in a case in which designation information designating an IO-Link device is included in the single instruction received by the communication controller, the processor executes backup of the IO-Link device designated in designation information or executes restoring of the IO-Link device designated in the designation information.

3. The relay device according to claim 1, wherein the processor further notifies a user of an IO-Link device of which backup or restoring is not ended normally among the plurality of IO-Link devices that are backup or restoring targets.

4. A control method for a relay device having a processor that relays data between a control device and a plurality of IO-Link devices that are control targets of the control device and operates in accordance with setting information, a plurality of device communication ports respectively communicating the plurality of IO-Link devices, an upper-level communication port communicating with an upper-level network, and a storage device, the control method comprising:
   a receiving step of receiving, by the processor, a single instruction for executing backup of the IO-Link devices or a single instruction for executing restoring of the IO-Link devices from the upper-level network, wherein each of the IO-Link devices has a dedicated physical communication connection with respective device communication port of the relay device and enables bidirectional communication of 32-bytes data with the relay device; and
   a setting information processing step of executing, by the processor, backup of the plurality of the IO-Link devices by acquiring the setting information of the IO-Link devices through the respective device communication ports and storing the acquired setting information in a plurality of port storage areas of the storage device respectively disposed for the plurality of device communication ports in accordance with the single instruction for executing backup of the IO-Link devices received in the receiving step and executing, by the processor, restoring of the plurality of the IO-Link devices by transmitting the setting information stored in the respective port storage areas of the storage device to the IO-Link devices through the respective device communication ports in accordance with the single instruction for executing restoring of the IO-Link devices received in the receiving step.

5. A non-transitory computer-readable recording medium, storing a control program for causing a processor of a relay device to relay data between a control device and a plurality of IO-Link devices being control targets of the control device and operating in accordance with setting information, the replay device further comprising a plurality of device communication ports respectively communicating the plurality of IO-Link devices, an upper-level communication port communicating with an upper-level network, and a storage device, wherein the control method comprises:
   a receiving step of receiving a single instruction for executing backup of the IO-Link devices or a single instruction for executing restoring of the IO-Link devices from the upper-level network, wherein each of the IO-Link devices has a dedicated physical communication connection with respective device communication port of the relay device and enables bidirectional communication of 32-bytes data with the relay device; and
   a setting information processing step of executing backup of the plurality of the IO-Link devices by acquiring the setting information of the IO-Link devices through the respective device communication ports and storing the acquired setting information n a plurality of port storage areas of the storage device respectively disposed for the plurality of device communication ports in accordance with the single instruction for executing backup of the IO-Link devices received in the receiving step and executing restoring of the plurality of the IO-Link devices by transmitting the setting information stored in the respective port storage areas of the storage device to the IO-Link devices through the respective device communication ports in accordance with the single instruction for executing restoring of the IO-Link devices received in the receiving step.

6. The relay device according to claim 2, wherein the processor further notifies a user of an IO-Link device of which backup or restoring is not ended normally among the plurality of IO-Link devices that are backup or restoring targets.

\* \* \* \* \*